United States Patent [19]

Walters

[11] Patent Number: 4,659,381

[45] Date of Patent: Apr. 21, 1987

[54] FLAME RETARDED ASPHALT BLEND COMPOSITION

[75] Inventor: Robert B. Walters, Morrison, Colo.

[73] Assignee: Manville Corporation, Denver, Colo.

[21] Appl. No.: 845,712

[22] Filed: Mar. 28, 1986

[51] Int. Cl.$^4$ ................................................ C09D 5/18
[52] U.S. Cl. ................................ 106/18.16; 106/18.17; 106/18.24; 106/18.25; 106/281 R; 524/59
[58] Field of Search ............ 106/18.24, 18.16, 281 R, 106/18.25, 18.17; 524/59

[56] References Cited

U.S. PATENT DOCUMENTS

| | | | |
|---|---|---|---|
| 2,667,425 | 1/1954 | Bierly | 106/18.24 |
| 4,022,945 | 5/1977 | MacKenzie et al. | 106/18.24 |
| 4,105,566 | 8/1978 | Miller et al. | 106/18.16 |
| 4,284,682 | 8/1981 | Frosch et al. | 106/18.24 |
| 4,512,806 | 4/1985 | Graham | 106/277 |

*Primary Examiner*—Lorenzo B. Hayes
*Attorney, Agent, or Firm*—John D. Lister; Cornelius P. Quinn; Gregory A. Evearitt

[57] ABSTRACT

A flame retarded asphalt composition comprising a blend of:
(a) modified bitumen;
(b) 1-20 wt % of at least one halogenated flame retardant; and
(c) 1-5 wt % of at least one inorganic phosphorus containing compound selected from the group consisting of ammonium phosphate compounds and red phosphorus.

The inventive flame retarded composition is classified as a Class A material according to ASTM E-108 and therefore has superior fire resistance properites.

8 Claims, No Drawings

4,659,381

FLAME RETARDED ASPHALT BLEND COMPOSITION

FIELD OF THE INVENTION

This invention relates to a flame retarded asphalt composition suitable for use as a roofing membrane.

BACKGROUND OF THE INVENTION

Various fabric reinforced modified bitumen or asphalt products have been used in the past as membranes on residential and commercial roofing. Typically the modified bitumen is used with suitable polymeric and/or fiber glass reinforcing mats, felts, or scrims to produce a sheet product which is used as the roofing membrane.

The disadvantage with these asphalt roofing products, though, is that their commercial success is dwindling because many jurisdictions have adopted tough and stringent building code regulations to which building materials such as roofing membranes must conform. These stringent building codes have been adopted because of the increasing amount of deaths and property damage which result each year from fires. Not surprisingly, as part of their criterion the stringent building codes are demanding that roofing materials meet the Class A requirement of the UL 790 or ASTM E-108 Tests which are essentially the same. The flame spread is a measure of the ability of the asphalt composition to retard the spread of flame subsequent to being ignited. A Class A material is one which has a flame spread (i.e., burn length) of no more than about 6 feet.

Since the existing asphalt based roofing membranes have been unable to meet the stringent Class A requirements, attempts have been made to modify the existing products. The most common procedure has been to flood coat a sheet material with asphalt and then coat the surface of the asphalt impregnated sheet with fine stone or gravel, the idea being that the gravel helps to retard the spread of flame.

This procedure is disadvantageous, though, for several reasons. To begin with, the procedure is labor intensive and time consuming. The final product is rather unattractive for commercial purposes and its weight is increased by the addition of the stone. Finally, the product does not char well which is disadvantageous since char creates an insulating layer which helps to block fire penetration.

What is needed in the industry is an asphalt based material which is suitable for use as a simple to construct, light weight, roof material and which meets the increasingly stringent fire code requirements as measured according to UL 790 or ASTM E-108.

SUMMARY OF THE INVENTION

In accordance with the present invention, Applicant has discovered that a modified bitumen or asphalt material is made particularly fire resistant by blending the modified bitumen with at least one halogenated flame retardant and at least one phosphorus containing inorganic compound selected from the group consisting of ammonium phosphate compounds and red phosphorus. Applicant's novel flame retarded asphalt composition is thus a blend of bitumen, 1-20 wt % halogenated flame retardant, and 1-5 wt % phosphorus containing inorganic compound.

The inventive flame retarded asphalt composition exhibits a flame spread (burn length) of 6 feet or less as tested per ASTM E-108 and therefore is a Class A material. Being both easy to construct and light weight, the inventive composition should enjoy a great amount of commercial success.

Other features and aspects as well as the various benefits of the invention will be made clear in the more detailed description which follows and the appended claims.

DETAILED DESCRIPTION OF THE INVENTION

As used herein, the terms "bituminous" and "bitumen" may be replaced with the term "asphalt" which substantially means petroleum asphalt.

The term "modified bitumen" as used herein signifies a bitumen material which has incorporated in it an agent to improve the elongation, flexibility, temperature susceptibility and adhesive properties of ordinary bitumen.

Examples of modifiers are thermoplastic elastomers or thermoplastic rubbers. These agents include, but are not limited to, styrene-butadiene-styrene (SBS), styrene-isoprene-styrene (SIS), and styrene-ethylene-butylene-styrene (SEBS). These agents may simply be blended into the bitumen.

While only a very small amount of the thermoplastic elastomer or rubber modifier needs to be present in the compound bitumen in order for desirable elongation, flexibility, temperature resistance and adhesiveness properties to be achieved, preferably about 3-20 wt % of the modifier is used based upon the weight of the compound bitumen, and most preferably about 6-15 wt %.

Preferably, about 20-40 wt % modified bitumen will be used in the inventive flame retarded composition based upon the total weight of the inventive composition. (As given throughout the specification, all percentages specified for materials and ingredients utilized in the inventive flame retarded composition are based upon the total weight of the composition.)

The modified bitumen will preferably contain about 20-30 wt% of one or more inert fillers. These fillers are generally finely divided solids. They are included to improve the properties of the inventive asphalt material. For example, the fillers are typically used to add weight (if desired), to act as extenders thereby increasing the volume of the composition at minimal cost, or act as reinforcing agents thereby providing increased strength. Examples of such fillers include, but are not limited to, perlite, mica powder, alumina, glass fibers, calcium carbonate (limestone), magnesium carbonate, finely divided clays, silica, and carbon black.

Whatever inert fillers are used should be finely divided such that they are easily blended with the other materials of the inventive composition and do not make it lumpy. Preferably, the average particle diameter of such an inert filler will be between about 40 and 300 microns.

It is thought that any commercially available halogenated flame retardant additive known to those skilled in the art can be utilized in the present invention. Examples of halogenated flame retarded additives include, but are not limited to the following:

multi-brominated diphenyl oxides, e.g., decabromodiphenyl oxide (DBDPO);
multi-brominated benzenes, e.g., 2,3,4,5,6-pentabromoethylbenzene;

multi-brominated bisphenol-A and esters thereof; e.g. tetrabromobisphenol-A;

multi-brominated diphenoxy compounds, e.g. 1,2-Bis 2,4,6-tribromophenoxy ethane;

multi-brominated pthalimides, e.g., ethylenebistetrabromophthalimide;

multi brominated phthalic anhydrides, e.g., tetrabromophthalic anhydrides;

multi-brominated phenols, e.g. 2,4,6-tribromo phenols;

multi-brominated cyclodecanes, e.g. hexabromocyclododecane; and chlorinated alicyclic hydrocarbons, e.g., Dechlorane Plus.

About 1-20 wt % and preferably about 3-10 wt % of the halogenated flame retardant compound is utilized in the present invention.

The inorganic phosphorous containing compound utilized in the present invention is at least one of the following: monoammnium phosphate, diammonium phosphate, triammonium phosphate, ammonium polyphosphate, and red phosphorus. About 1-5 wt % and preferably about 2-4 wt % of the inorganic phosphorus containing compound is utilized in the present invention.

A metal oxide hydrate may also be utilized. Examples include aluminum trihydrate, calcium borate hydrates, barium borate hydrates, zinc borate hydrates, and magnesium oxide hydrates. When utilized, the metal oxide hydrate should be present in an amount of no greater than about 30 wt %.

The inventive composition can be prepared by heating the modified bitumen to about 350° F. and then dry blending the other ingredients with a spatula. Alternatively, a Ross high speed blender may be utilized.

The following example further illustrates the present invention.

EXAMPLE

A series of asphalt based compounds were prepared according to the formulations given below in the Table. (All wt %'s of ingredients are based upon the total weight of the composition.) The samples were then tested for flame spread according to the test procedure of ASTM E-108. The results are given in the Table.

TABLE I

| Composition, wt % | Sample 1 (Non-inventive) | Sample 2 (Inventive) | Sample 3 (Inventive) |
|---|---|---|---|
| Modified (SBS) Butumen | 70 | 70 | 70 |
| Limestone filler | 27 | 22 | — |
| Aluminum Trihydrate | — | — | 22 |
| Ammonium Polyphosphate[A] | 3 | 3 | 3 |
| Decabromodiphenyl Oxide[B] | — | 5 | 5 |
| Burn length, Ft. | 8+ | 5.5 | 4.75 |
| Burn Area, Sq. Ft. | 15.4 | 9.5 | 6.5 |

[A]Phoshek P/30 available from Monsanto Company
[B]Great Lakes DE-83 available from Great Lakes Chemical Corporation The above data show a superior flame spread performance for the inventive Samples 2 and 3 as compared to non-inventive Sample 1. Samples 2 and 3 are well within the Class A material limits, i.e., a flame spread (burn length) of 6 feet or less. Sample 1 clearly falls outside the group of Class A compounds.

Reasonable modifications and variations are possible from the foregoing disclosure without departing from either the spirit or scope of the present invention as defined by the claims.

I claim:

1. A flame retarded asphalt composition consisting essentially of a blend of:
   (a) thermoplastic elastomer modified bitumen;
   (b) 20-30 wt % inert filler
   (c) 1-20 wt % of at least one halogenated flame retardant; and
   (d) 1-5 wt % of at least one inorganic phosphorus containing compound selected from the group consisting of ammonium phosphate compounds and red phosphorus.

2. A flame retarded asphalt composition according to claim 1 consisting essentially of a blend of:
   (a) 20-40 wt % thermoplastic elastomer modified bitumen;
   (b) 20-30 wt % inert filler
   (c) 3-10 wt % halogenated flame retardant; and
   (d) 2-4 wt % inorganic phosphorus containing compound.

3. A flame retarded composition according to claim 1 further containing up to 30 wt % of at least one metal oxide hydrate.

4. A flame retarded composition according to claim 1 wherein said halogenated flame retardant is decabromodiphenyl oxide.

5. A flame retarded composition according to claim 1 wherein said inorganic phosphorus containing compound is ammonium polyphosphate.

6. A flame retarded composition according to claim 1 wherein said inert filler is limestone.

7. A flame retarded composition according to claim 3 wherein said metal oxide hydrate is aluminum trihydrate.

8. A flame retarded composition according to claim 1 which is classified as a Class A material according to ASTM E-108.

* * * * *